April 21, 1953 H. A. HUTCHINSON 2,635,266
MACHINE FOR CLEANING EGGS
Filed Sept. 20, 1949 4 Sheets-Sheet 1
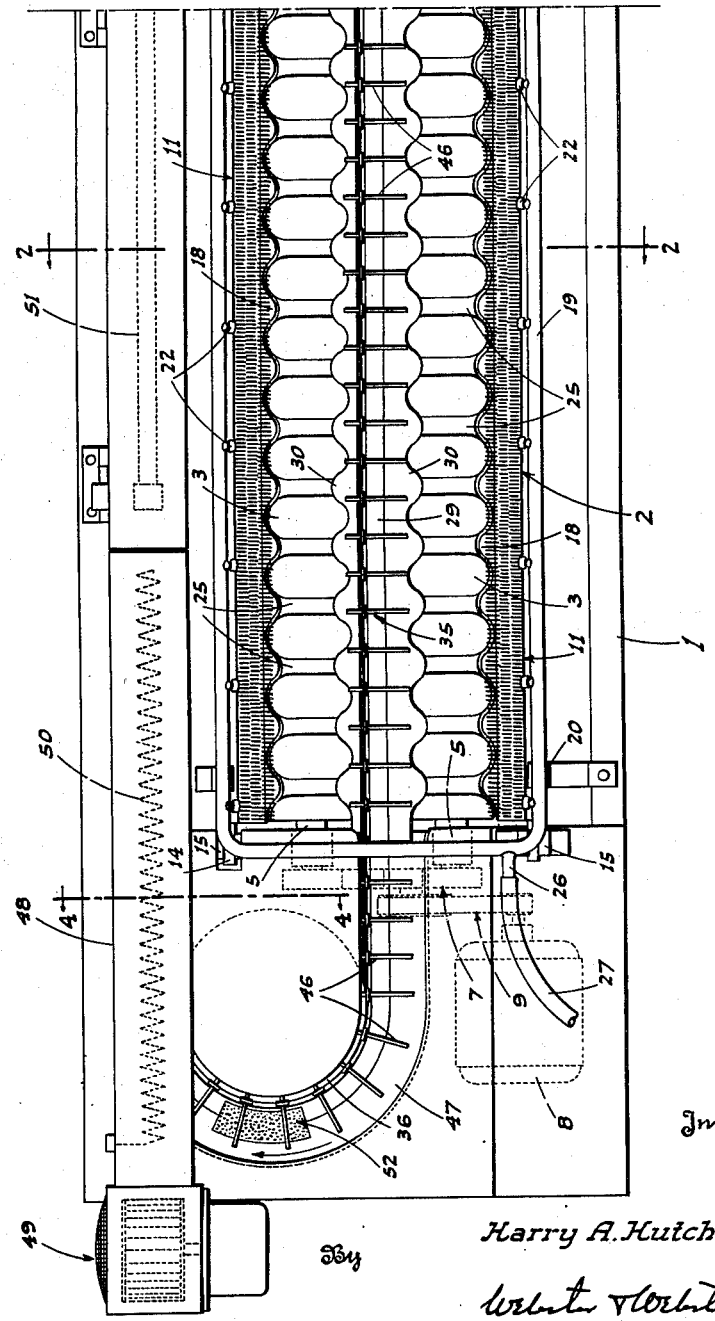
Inventor
Harry A. Hutchinson
By
ATTORNEYS April 21, 1953     H. A. HUTCHINSON     2,635,266
MACHINE FOR CLEANING EGGS
Filed Sept. 20, 1949     4 Sheets-Sheet 2
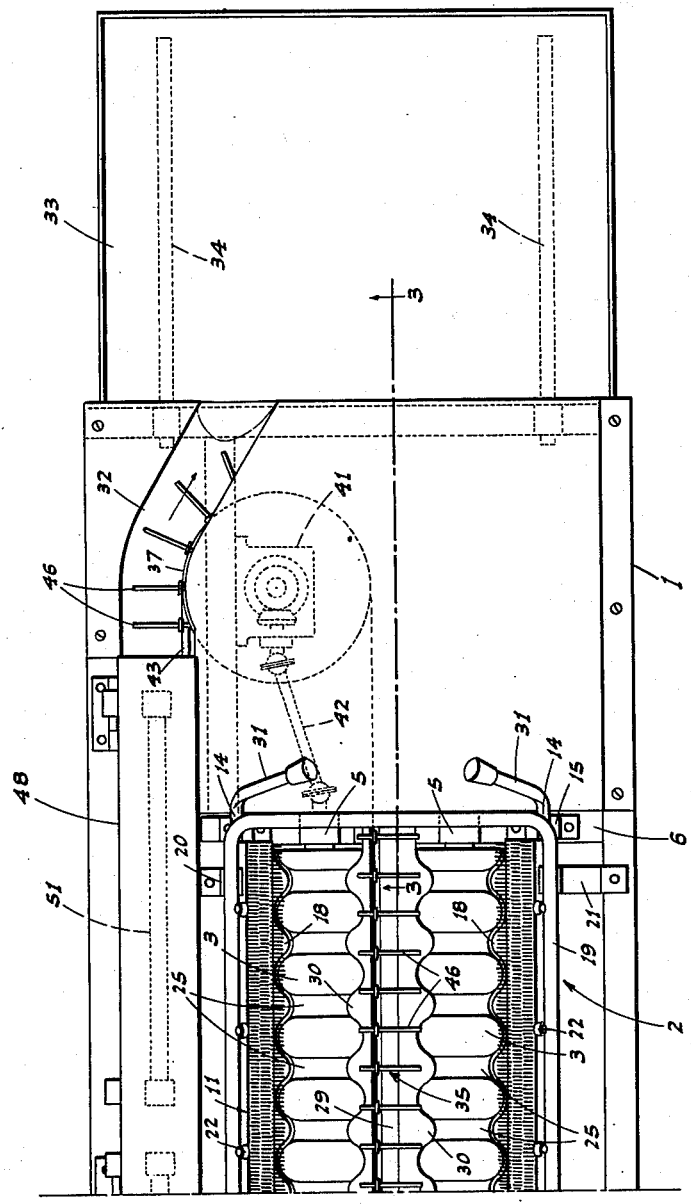
Inventor
Harry A. Hutchinson
By
ATTORNEYS April 21, 1953 H. A. HUTCHINSON 2,635,266
MACHINE FOR CLEANING EGGS
Filed Sept. 20, 1949 4 Sheets-Sheet 3

Inventor
Harry A. Hutchinson

ATTORNEYS

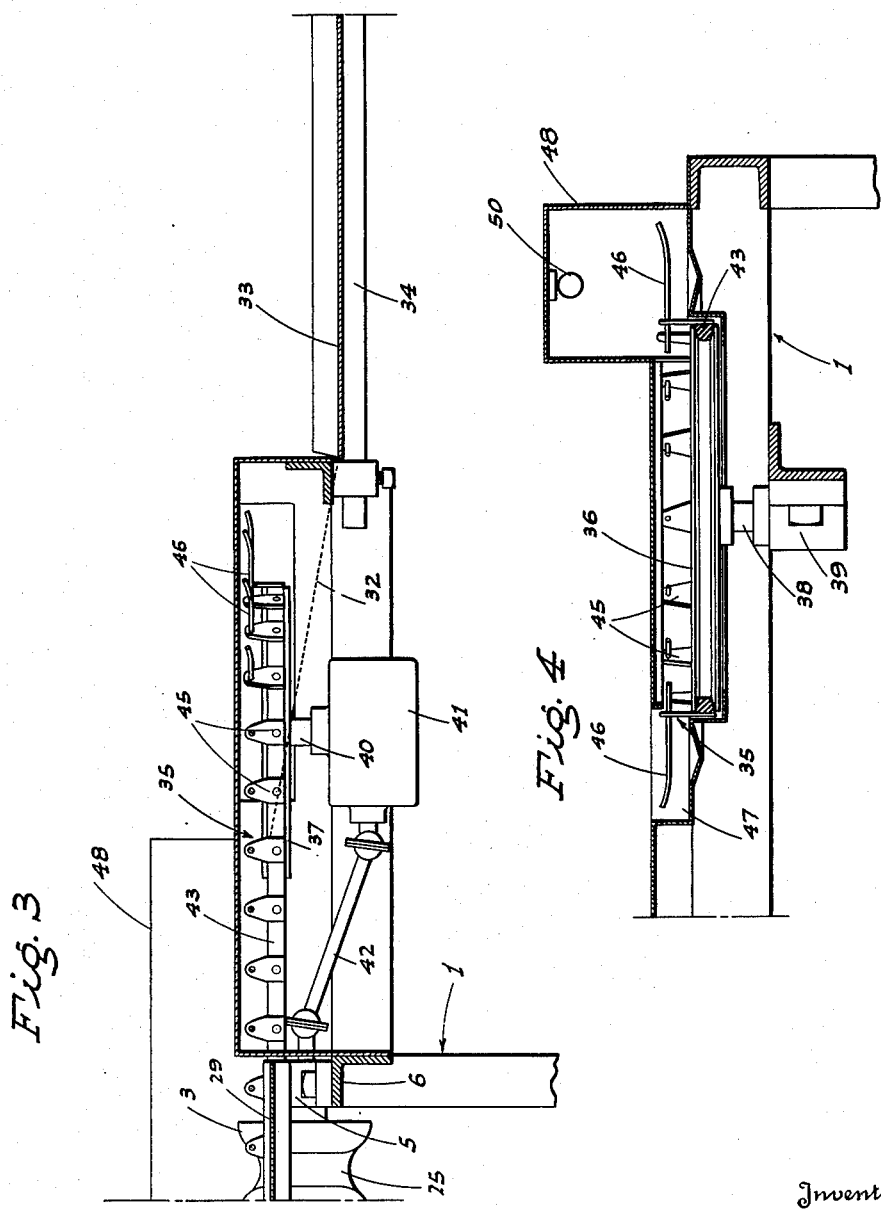

Patented Apr. 21, 1953

2,635,266

UNITED STATES PATENT OFFICE 2,635,266

MACHINE FOR CLEANING EGGS

Harry A. Hutchinson, Sebastopol, Calif., assignor to H. & P. Egg Cleaner Co., Sebastopol, Calif., a partnership Application September 20, 1949, Serial No. 116,807

6 Claims. (Cl. 15—3.13)

This invention relates to a machine for cleaning eggs preparatory to marketing them; the machine being of a power driven, high capacity type.

One important object of the present invention is to provide a novel machine for cleaning eggs, which is operative to conduct the process rapidly and effectively; such process including washing, drying, and anti-bacterial treatment.

Another object of the invention is to provide a machine for cleaning eggs, which embodies an egg supporting and washing mechanism of novel construction and function; such mechanism including an elongated, circumferentially corrugated roller and a cooperating longitudinal brush, the latter being swingable from a normal working position relative to the roller to another position which causes automatic discharge of all the eggs from said mechanism into engagement by an adjacent conveyor.

A separate object of the invention is to provide a machine for cleaning eggs, which comprises a novel combination, with a constantly driven conveyor, of the above egg washing mechanism.

A further object of the invention is to provide a machine, as in the preceding paragraph, wherein the conveyor is endless and horizontally disposed; the egg washing mechanism being mounted adajacent one run of the conveyor to deliver thereto.

An additional object of the invention is to provide a machine for cleaning eggs, which is arranged for ease of manual placement of the eggs in, and their removal from, said machine.

It is also an object of the invention to provide a machine for cleaning eggs, designed for economy and simplicity of manufacture; the machine, nevertheless, being sturdy, and requiring a minimum of maintenance or repair.

A further object of the invention is to provide a commercially practical and reliable machine for cleaning eggs, and one which will be exceedingly effective for the purpose for which it is designed.

These objects are accomplished by means of such structure and relative arrangement of parts as will fully appear by a perusal of the following specification and claims.

In the drawings:

Figs. 1 and 1-A comprise, together, a full top plan view of the machine, each figure representing one longitudinal half of the machine.

Fig. 3 is a fragmentary longitudinal sectional elevation on line 3—3 of Fig. 1-A.

Fig. 4 is a fragmentary cross section on line 4—4 of Fig. 1.

Figure 2:
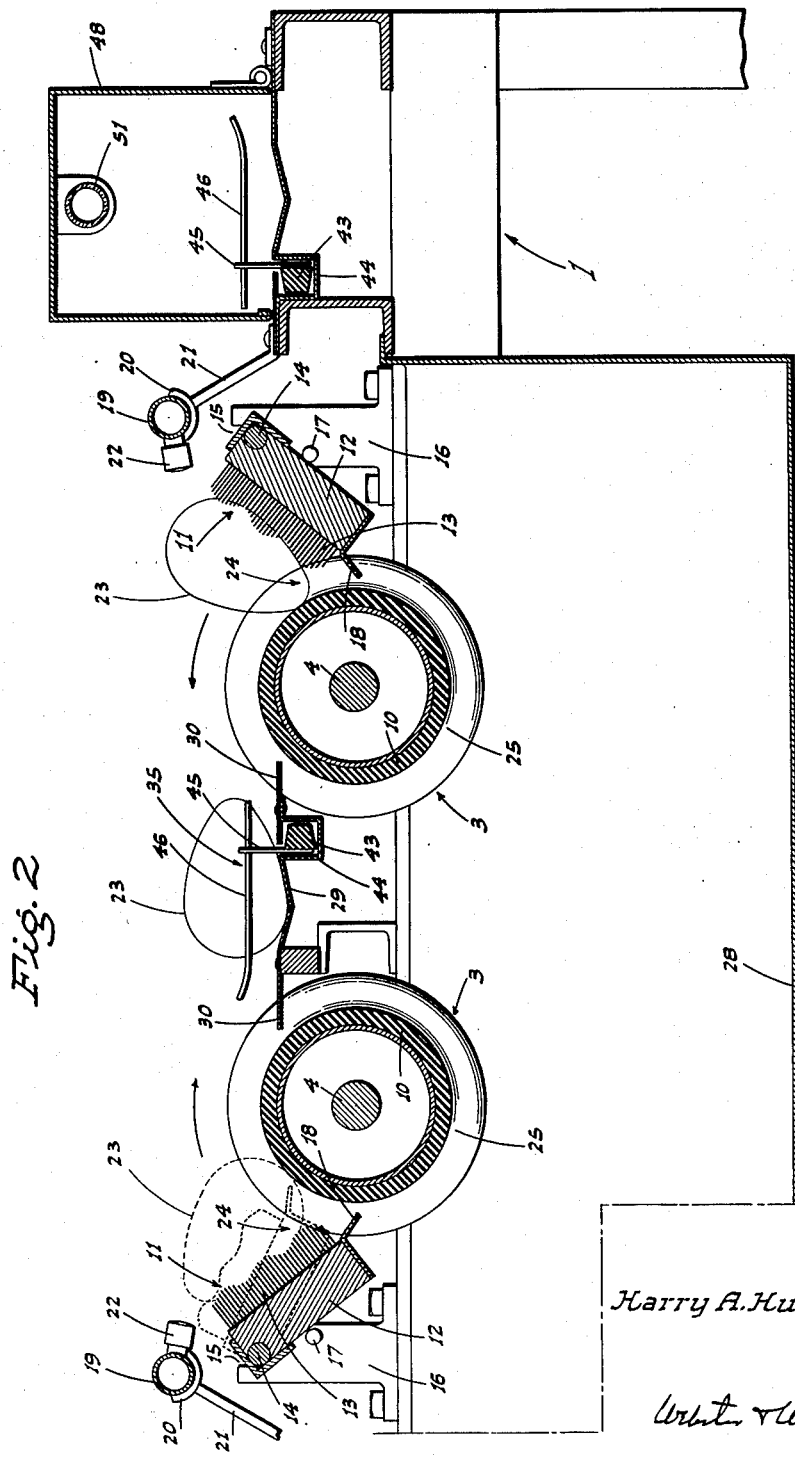
Fig. 2 is an enlarged cross section on line 2—2 of Fig. 1.

Referring now more particularly to the characters of reference on the drawings, the machine comprises a rigid, upstanding main frame, indicated at 1, and which frame is horizontally elongated.

Intermediate the ends thereof, and substantially centrally of its sides, the main frame 1 carries an egg supporting and washing mechanism, indicated generally at 2, such mechanism comprising the following:

A pair of transversely spaced, longitudinally extending rollers 3 are journaled in connection with the top portion of the main frame 1; such rollers 3 including center shafts 4 journaled at the ends, as at 5, in connection with cross members 6 of said frame.

The rollers 3 are driven in unison, with said rollers turning toward each other at the top, by means of a gear train 7 connecting the center shafts 4 at one end thereof; such gear train 7 being driven in turn from an electric motor 8 by means of an endless belt and pulley unit 9.

The rollers 3 are circumferentially corrugated, as shown, and are provided throughout with resilient facing 10.

A longitudinal brush unit, indicated generally at 11, is disposed laterally outward in cooperative relation to each roller 3, being formed and mounted as follows:

Each brush unit 11 comprises a longitudinal back bar 12 having bristles 13 projecting from the working face thereof and for the full length of said bar. At the top thereof the longitudinal back bar 12 is fitted with a horizontal, longitudinal shaft 14, which shaft projects beyond opposite ends of said bar 12 and removably rests in a cradle 15 in the upper end of an adjacent standard 16 which upstands from the main frame 1.

The bristles, while shown diagrammatically in the drawings, are actually trimmed to form grooves at right angles to bar 12 in slightly angled opposed relation to the roller grooves and so as to conform to the curvature of the eggs. This shaping of the bristles, together with the form and upward and outward rotation of the rollers, causes the eggs to revolve about both axes while holding the eggs spaced, and preventing them from striking each other and possibly checking the shells. Nor are the eggs bounced or vibrated in a manner to loosen the yolks.

Each longitudinal back bar 12 is limited in its downward movement by stop pins 17 on the standards 16 below the corresponding shaft 14. As so limited in its downward motion the bar 12 is in its normal working position, inclining downwardly and inwardly substantially tangential to the corresponding roller 3. At the lower edge thereof each back bar 12 includes a laterally inwardly projecting longitudinal lip 18 which is scalloped in matching relation to, and projects into, the grooves of said roller in offset relation to the center thereof, in such a manner that the eggs revolve on their long axis at the same time they are being revolved on their short axis by the roller. This insures that all areas of the egg shells are turned to the brush face and hence no portion is left uncleaned.

A longitudinal, low-pressure water supply pipe 19 extends above each back bar 12, being removably supported in cradles 20 on the upper ends of posts 21. Each water supply pipe 19 may have spray holes or laterally inwardly projecting spray nozzles 22, whereby water is sprayed from said nozzles onto eggs 23 riding in the pockets 24 formed by the downward convergence of the roller channels 25 and the brush units 11. The low pressure used prevents water being forced into the pores of the shells, with a deleterious effect.

When the machine is in operation the pockets 24 corresponding to each of the rollers 3 are filled with eggs, and with rotation of such rollers the eggs turn end over end, being brushed by the bristles 13 to clean the same. The pipes 19 are interconnected at opposite ends, and water is supplied to the pipe assembly through the medium of a fitting 26 and a hose 27.

Below the washing mechanism 2 the machine includes a water tank 28 to catch the water which drips from the assembly of rollers 3 and brush units 11.

This tank may carry a working supply of water suitably heated to the most efficient cleaning temperature, and thus providing an economical means of using detergents and/or bactericides during the washing operation.

After a row of eggs 23 has been thoroughly washed or cleaned by each roller 3 and the related brush unit 11, the latter is swung upwardly from its working position to an egg discharge position. See the dotted line position of the left hand brush unit in Fig. 2. As such brush unit 11 is swung upwardly to its egg discharge position, the eggs 23 are carried upwardly on the roller 3 so that they approach top dead-center of the latter, whereupon such eggs ride over the top of the roller and fall into a longitudinal trough 29 which extends horizontally between the rollers 3. The trough 29 is suitably mounted in connection with the main frame, and includes laterally projecting flanges 30 which are scalloped in matching relation to, and project into the corrugations of, adjacent rollers 3. This is to assure that eggs as discharged from the roller effectively clear the latter and immediately transfer to the trough 29.

The trough is transversely sloped or curved in such a manner that the eggs will roll gently into place therein, preventing breaking or checking of the shells. Also, they will be rolled on their long axis into and through the tunnel in a smooth and regular manner, facilitating drying and also exposing all areas of the eggs to the germicidal lamps. Also, jostling or wedging of the eggs in the machine, with resultant damage to the eggs, is prevented.

The brush units 11 are adapted to be selectively and independently swung upward, to egg discharge position, by means of an upstanding hand lever 31 on the right hand end of the shafts 14 which support the back bars 12.

The trough 29 extends a short distance beyond the left hand end of the washing mechanism 2, then defines a half circle rearwardly, and thence has a rear portion which extends straight and lengthwise of the main frame to the rear of said washing mechanism 2 for at least the full length of the latter.

At its free end the rear portion of said trough 29 is formed with a chute 32 which discharges onto an egg receiving tray 33 removably supported by the arms 34 which project outwardly from the adjacent end of the main frame 1.

An endless egg conveyor, indicated generally at 35, is mounted on the main frame 1 and has a forward run which cooperates with the portion of the trough 29 between the rollers 3, and a rearward run which cooperates with the rear portion of said trough; one turn of the conveyor working in matching relation above the half-circle portion of the trough 29 which connects adjacent ends thereof.

Such endless conveyor 35 comprises a pair of vertical-axis pulleys 36 and 37 disposed beyond opposite ends of the washing mechanism 2; the pulley 36 having a downwardly projecting spindle 38 journaled in connection with the main frame, as at 39. The pulley 37 includes a downwardly projecting spindle 40 which extends into a gear box 41 driven by a universal shaft 42 from the adjacent end of one of the center shafts 4. In this manner the pulley 37 and consequently the endless conveyor 35 are driven from the washing mechanism 2, which in turn is actuated by the motor 8. This simplifies the structure and permits the one motor 8 to drive both said washing mechanism 2 and endless conveyor 35.

An endless belt 43 extends between and is trained about the pulleys 36 and 37; the forward and rearward runs of such belt extending in suitable guide channels 44 disposed laterally, but adjacent the front and rear portions, of the trough 29.

A multiplicity of upstanding fingers 45 are fixed on the belt 43 in spaced relation, and each finger 45 carries a transverse pusher rod 46 which overlies the trough 29 in egg advancing relation thereto; the fingers 45 and pusher rods 46 being spaced apart a distance sufficient to permit an egg to seat therebetween in the trough 29.

The pusher rods are shaped and designed to prevent fracture of eggs contacting the same, and so that the moving eggs are maintained in their proper position at the center of the trough 29, and are rolled about their longitudinal axis in a positive manner as they are conveyed forward.

It will therefore be recognized that as each row of eggs is discharged from one of the rollers 3 by upward swinging of the corresponding brush unit 11, such row will fall onto the adjacent portion of the trough 29, with each egg engaged between a pair of the pusher rods 46. Such eggs are then advanced along the trough by said pusher rods, traversing the half-circle end portion of the trough, and then traveling lengthwise along the rear portion thereof to final discharge into the chute 32, whereupon said eggs roll onto the egg receiving tray 23.

To assure that the eggs do not escape radially outwardly from the half-circle end portion of the trough 29, the latter is formed in a curved end channel 47. From the end channel 47 the eggs are advanced by the endless conveyor 35 into a horizontal, longitudinal tunnel 48 which encompasses substantially the entire rear portion of said trough 29.

The tunnel 48 is sectional for ease of access to the parts mounted therein.

A motor driven blower 49 feeds air through the tunnel 48 in the direction in which the endless conveyor travels therethrough; the forward section of the tunnel 48 including an electric heating unit 50 therein. Thus, as the eggs leave the washing mechanism 2 and advance in wet condition into the tunnel 48 they are first dried by the electric heating unit 50; the moist air being carried away by the air stream generated in the tunnel 48 by the motor driven blower 49.

Beyond the electric heating unit, in the direction of advance, the tunnel 48 is fitted with one or more germicidal lamps 51 which has an anti-bacterial effect on the eggs passing thereunder. After the eggs pass the germicidal lamps 51 they reach the chute 32, whereupon they fall away from the pusher rods 46 and deliver down the chute 32, as hereinbefore described.

Rather than delivering onto tray 33, chute 32 may discharge onto a mechanical scale, or onto a moving belt to carry the eggs to be candled, graded, cased or otherwise serviced and handled.

The working parts of the machine are constantly in operation when such machine is in use, one substantial advantage of the machine being that the rows of eggs engaged between the rollers 3 and brush units 11 may be permitted to remain in the washing mechanism 2 for a variable length of time so as to assure that the washing is complete.

As the washing of each row of eggs is completed the operator merely swings the corresponding hand lever 31 to cause such row to discharge into the trough 29 for advance, automatically, by the endless conveyor 35 into the tunnel 48, first for the drying step, and then the anti-bacterial step as described.

To speed up the drying process, a brush 52 may project into the curved portion 47 of trough 29 adjacent the entry to the drying tunnel, so that as the eggs are moved forward and revolved on their way into the tunnel, they pass over the brush, thus removing any excess water.

The machine provides for the very practical and efficient washing of eggs, having a relatively high capacity without complexity of mechanism.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a machine for cleaning eggs, a frame, a driven longitudinal roller on the frame, a longitudinal brush unit mounted adjacent one side of the roller in normally downwardly converging relation thereto whereby to pocket eggs between the roller and brush unit, the roller turning upwardly on said one side, means mounting the brush unit for upward motion to raise the eggs sufficiently to cause them to ride over the top of the roller, and egg receiving means extending along the other side of the roller; the roller being circumferentially corrugated, and the brush unit including a laterally inwardly projecting lip on its lower edge scalloped in matching relation to and normally closely adjacent said corrugated roller.

2. In a machine for cleaning eggs, a frame, a driven longitudinal roller on the frame, a longitudinal brush unit mounted adjacent one side of the roller in normally downwardly converging relation thereto whereby to pocket eggs between the roller and brush unit, the roller turning upwardly on said one side, means mounting the brush unit for upward motion to raise the eggs sufficiently to cause them to ride over the top of the roller, and an egg receiving and conveying assembly along the other side of the roller arranged to convey the eggs thereon lengthwise of the roller to a point beyond the same.

3. In a machine for cleaning eggs, a frame, a driven longitudinal roller on the frame, a longitudinal brush unit mounted adjacent one side of the roller in normally downwardly converging relation thereto whereby to pocket eggs between the roller and brush unit, the roller turning upwardly on said one side, means mounting the brush unit for upward motion to raise the eggs sufficiently to cause them to ride over the top of the roller, an egg receiving trough extending longitudinally along the opposite side of the roller, and an endless conveyor associated with the trough; said conveyor comprising an endless flexible member having one run disposed adjacent one side of the trough and extending lengthwise thereof, fingers upstanding from said member at intervals, and lateral egg-engaging pusher elements projecting laterally from the fingers in overhanging relation to the trough, said elements being spaced apart a distance not less than the diameter of an egg.

4. In a machine for cleaning eggs, a frame, a driven longitudinal roller on the frame, a longitudinal brush unit mounted adjacent one side of the roller in normally downwardly converging relation thereto whereby to pocket eggs between the roller and brush unit, the roller turning upwardly on said one side, means mounting the brush unit for upward motion to raise the eggs sufficiently to cause them to ride over the top of the roller, and an egg receiving trough extending longitudinally along the opposite side of the roller; the roller being circumferentially corrugated and said trough including a flange projecting toward the roller in normally closely adjacent, matchingly scalloped relation thereto.

5. In a machine for cleaning eggs, a frame, a pair of driven longitudinal rollers on the frame in adjacent substantially parallel relation, an egg receiving trough mounted between adjacent sides of the rollers of a width to receive a single egg lengthwise, a longitudinal brush unit mounted adjacent the outer side of each roller in normally downwardly converging relation thereto whereby to pocket eggs between each roller and brush unit, the rollers turning upwardly on their outer sides, and means mounting the brush units for upward motion independent of each other to raise the eggs sufficiently to cause them to ride over the top of the rollers onto said egg receiving trough.

6. In a machine for cleaning eggs, a frame, a pair of driven longitudinal rollers on the frame in adjacent substantially parallel relation, egg receiving means mounted between adjacent sides of the roller, a longitudinal brush unit mounted adjacent the outer side of each roller in normally downwardly converging relation thereto whereby to pocket eggs between each roller and brush unit, the rollers turning upwardly on their outer sides, and means mounting the brush units for upward motion to raise the eggs sufficiently to cause them to ride over the top of the rollers onto said egg receiving means; there being an egg conveyor included with said egg receiving means to move the eggs on said receiving means lengthwise of the rollers to a point beyond the same.

HARRY A. HUTCHINSON.

References Cited in the file of this patent

UNITED STATES PATENTS

| Number | Name | Date |
| --- | --- | --- |
| 1,392,546 | Williamson | Oct. 4, 1921 |
| 1,754,612 | Cook | Apr. 15, 1930 |
| 1,776,784 | Cramer | Sept. 30, 1930 |
| 1,781,425 | Anderson | Nov. 11, 1930 |
| 2,087,844 | Hansen | July 20, 1937 |
| 2,179,474 | Stebler | Nov. 7, 1939 |
| 2,182,184 | Todd | Dec. 5, 1939 |
| 2,199,827 | Skinner | May 7, 1940 |
| 2,199,831 | Cunning | May 7, 1940 |
| 2,378,418 | Lister | June 19, 1945 |
| 2,412,565 | Davis | Dec. 17, 1946 |